United States Patent [19]

Simmons et al.

[11] Patent Number: 5,605,717
[45] Date of Patent: Feb. 25, 1997

[54] PROCESS FOR FOAMING AN ADHESIVE USING MOISTURE IN A BACKING

[75] Inventors: George R. Simmons, Mentor; John L. Schmitz, Hiram, both of Ohio

[73] Assignee: Morgan Adhesives Company, Stow, Ohio

[21] Appl. No.: 457,088

[22] Filed: Jun. 1, 1995

[51] Int. Cl.[6] .................................................. B05D 5/10
[52] U.S. Cl. ........................... 427/208.2; 427/208.4; 427/373; 156/79; 156/308.8
[58] Field of Search ................................ 427/208.2, 226, 427/373, 208.4; 156/79, 308.8

[56] References Cited

U.S. PATENT DOCUMENTS

| | | |
|---|---|---|
| 2,797,201 | 6/1957 | Veatch et al. . |
| 3,172,868 | 3/1965 | Jefferson . |
| 3,293,198 | 12/1966 | Jefferson . |
| 3,415,920 | 12/1968 | Lee et al. . |
| 3,489,700 | 1/1970 | Kanai et al. . |
| 3,513,112 | 5/1970 | Kanai et al. . |
| 3,558,530 | 1/1971 | Schroeder et al. . |
| 3,708,444 | 1/1973 | Ganzler et al. . |
| 3,823,211 | 7/1994 | Colombo . |
| 4,167,431 | 9/1979 | Wong . |
| 4,379,806 | 4/1983 | Korpman . |
| 4,387,066 | 6/1983 | Pip . |
| 4,407,888 | 10/1983 | Crofts . |
| 4,419,459 | 12/1983 | Melchior . |
| 4,430,135 | 2/1984 | Schmukler et al. . |
| 4,453,997 | 6/1984 | Hori et al. ............................ 427/208.2 |
| 4,455,184 | 6/1984 | Thompson . |
| 4,464,486 | 8/1984 | Kramer et al. . |
| 4,529,739 | 7/1985 | Scott et al. . |
| 4,549,915 | 10/1985 | Ritschel et al. ............................ 156/78 |
| 4,576,971 | 3/1986 | Baumgartner et al. . |
| 4,649,164 | 3/1987 | Scott et al. . |
| 4,652,325 | 3/1987 | Benge et al. . |
| 4,764,542 | 8/1988 | Miranda . |
| 4,888,075 | 12/1989 | Freedman . |
| 4,918,110 | 4/1990 | Kuo et al. . |
| 5,026,738 | 6/1991 | Meinhard . |
| 5,047,196 | 9/1991 | Zuckerberg et al. . |
| 5,053,437 | 10/1991 | Moll et al. . |
| 5,123,988 | 6/1992 | Iwasa . |
| 5,322,709 | 6/1994 | Lulla et al. ............................ 427/208.2 |
| 5,334,447 | 8/1994 | Kitamura et al. . |
| 5,342,858 | 8/1994 | Litchholt et al. . |

FOREIGN PATENT DOCUMENTS

| | | |
|---|---|---|
| 59-122570 | 7/1980 | Japan . |
| 50-18492 | 4/1990 | Japan . |
| WO93/07228 | 4/1993 | WIPO . |

Primary Examiner—Michael W. Ball
Assistant Examiner—Richard Crispino
Attorney, Agent, or Firm—Oldham & Oldham Co., L.P.A.

[57] ABSTRACT

Adhesive laminates and their preparation. According to one embodiment, an adhesive laminate comprising a foamed pressure sensitive adhesive layer and a release liner applied thereto is prepared by applying hot pressure sensitive adhesive material in layer form to a release coated surface of a release paper or other release liner. Moisture is transferred from the release liner to the hot molten adhesive layer, causing the latter to foam. According to a second embodiment, a coextrudate comprising a thermoplastic carrier with an adhesive coating on one or both sides thereof is formed by the coextrusion of the adhesive taking place with the carrier over at least a short distance and at a temperature of about 350° F.

5 Claims, 2 Drawing Sheets

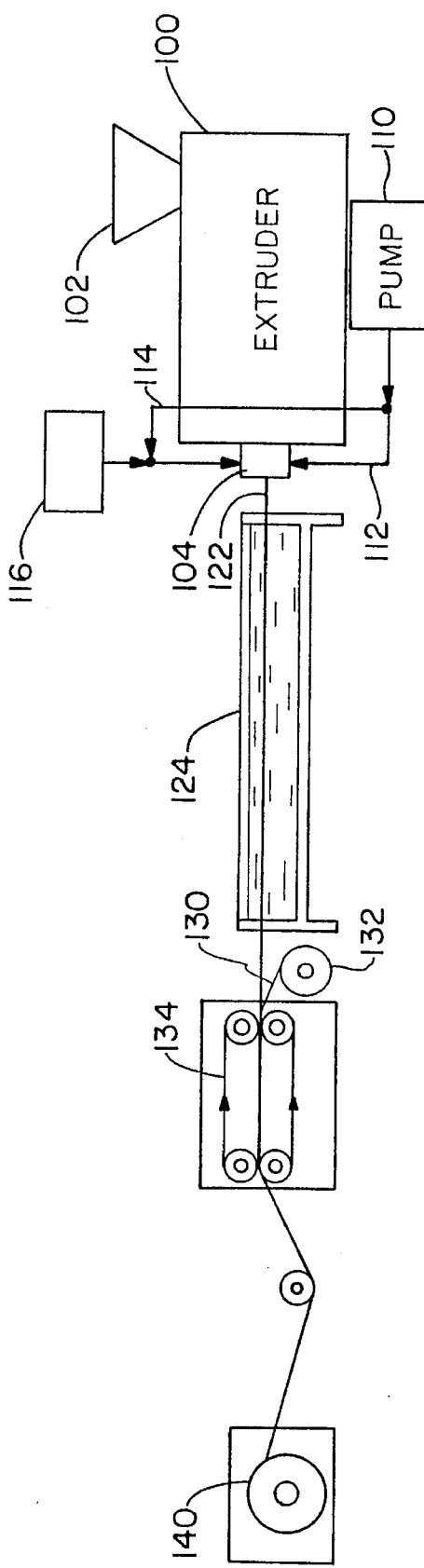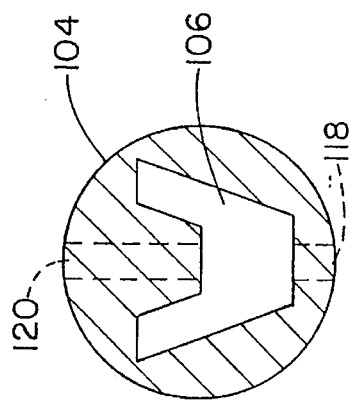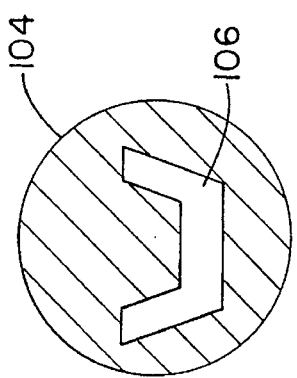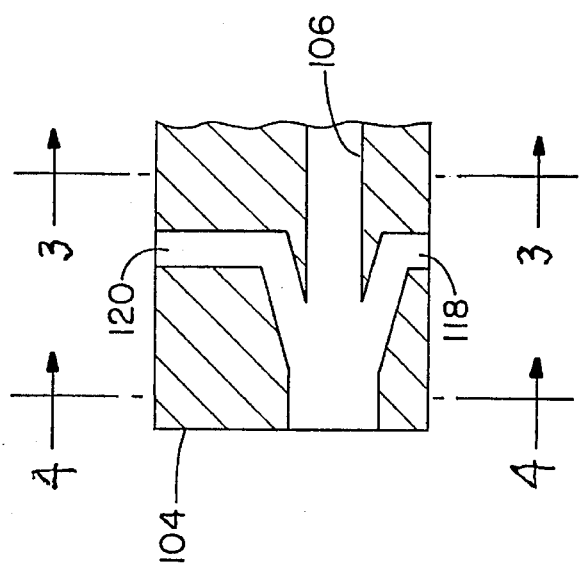

PROCESS FOR FOAMING AN ADHESIVE USING MOISTURE IN A BACKING

TECHNICAL FIELD

This invention relates to pressure sensitive adhesive laminates and to methods for forming the same.

BACKGROUND ART

Coextrusion has been widely described in the literature (including patents) as a technique for forming pressure sensitive adhesive laminates comprising one or more pressure sensitive adhesive layers and one or more backing layers. Again, reference is made to PCT publication WO 93/07228 in this regard although numerous other references could also be cited. According to FIG. 1B of WO 93/07228, a pressure sensitive adhesive tape comprising a backing or carrier layer; pressure sensitive adhesive layers on both sides thereof (illustrated in FIG. 1B) may be formed. FIG. 2 of this reference shows pressure sensitive hot melt adhesive streams (102 and 112) and a carrier stream (122) are supplied to a feed block (130) as a molten stream that combines into a single flow channel, which is then extruded through an extrusion die (140). The molten structure discharged from the extrusion die (140) can be cooled and laminated onto a release liner (150).

Foamed plastic, rubber and resin products are well known in the art. Such products encompass both a wide range of polymeric materials and a wide range of uses. Uses include, for example, structural materials, insulating materials (polystyrene foam cups, for example), just to name a few.

Foamed plastic materials are known as materials for both carriers (or substrates) and pressure sensitive adhesive layers in the pressure sensitive adhesive art, although the volume of prior art in this area is limited compared to the total volume of art on foamed plastics, rubber and resins generally.

U.S. Pat. No. 5,342,858 to Litchholt, et. al. describes elastomeric adhesive foams which are formed from an elastomeric, hot-melt adhesive material which is preferably pressure sensitive. Adhesive laminates are shown diagrammatically in Figure 1. Among these is an adhesive laminate in which an adhesive foam is formed on release paper (see especially Column 21, Line 51).

Adhesive laminates comprising pressure sensitive adhesive on a foamed thermoplastic backing layer are also known. See for example, published PCT International application WO 93/07228, published 15 Apr. 1993, especially Example 11 thereof. Pressure sensitive adhesive in this reference may be either foamed (see page 9, line 13 and 14) or non-foamed.

Foaming or blowing is invariably obtained by incorporation of a foaming or blowing agent into the polymer to be foamed prior to formation of any laminate. Foaming or blowing agents can be broadly classified as either chemical or physical. Chemical foaming or blowing agents form a foam or cell structure by decomposition of the foaming agent when decomposition temperature is reached. Physical foaming agents e.g., chlorinated hydrocarbons, ketones and alcohols, cause a cell structure to form by evaporation upon heating. Also known are gaseous foaming agents, which are incorporated into a thermoplastic mix at a higher pressure and foam formation results as the pressure is reduced. U.S. Pat. 5,342,858 cited supra (especially FIG. 2 and Column 11, lines 25 through 37, thereof) is illustrative of gaseous foaming agents.

BACKGROUND OF THE INVENTION

One of the problems facing the pressure sensitive adhesive industry is the problem of adhering a hot-melt adhesive to a polyethylene profile. Through this invention, we have obtained anchorage of the adhesive by pumping the hotmelt adhesive into the polyethylene extrusion die at the same time of making the profile, which is shown in FIGS. 1, 2, 3 and 4 in the specification. Once the extrusion takes place, the combined profile is cooled and laminated to a release liner.

One other aspect of this invention was the problem in making a single or double hot melt adhesive coated foam product utilizing the extruder with hot melt adhesive, which could have been achieved utilizing blowing agents to get a satisfactory foam from the extruded polymers. We ran trials utilizing this type of system with chemical blown polymers, and while the system worked, the foams were more dense (40 lbs./ft$^3$ instead of 10 lbs/ft$^3$) and thus too hard and stiff compared to the results obtained utilizing the water blown foamed product of this invention. Further, we ran trials with a gas injected tandem extruder utilizing chemical blowing agents and gas injection while the density of the foam polyethylene utilizing this method was 10 lbs/ft$^3$, it achieved too large a cell size and was still too hard, and hence was unsatisfactory. Our further review, looking for other ways to get softer foams with two- part acrylics, urethanes or silicones did result in softer foams but did not develop a method to apply the adhesive while making a satisfactory foam. It was in the process of trying this all out that we discovered the use of a two-sided release coated paper liner, and that the moisture content in the paper liner foamed the adhesive uniformly when we coated a non-foamed adhesive strip about 15 mils in thickness in association with the two-sided release coated paper.

SUMMARY OF THE INVENTION

This invention according to a first aspect provides a coextrusion process for forming pressure sensitive adhesive laminates. According to this aspect of the invention, the thermoplastic carrier or backing layer is extruded to the desired shape which may be flat but may also be a channel shape as will be described in detail below, and then one or two streams of pressure sensitive adhesive material are brought together with the carrier at the tip of an extrusion die, and the resulting laminate extruded. The resulting laminate comprises a carrier or backing layer and pressure sensitive adhesive layer (or layers) adhered to one or both sides of the carrier layer.

This invention according to a second aspect provides a method for preparing a laminate comprised of non-foamed pressure sensitive adhesive deposited on a web of release liner (preferably a release paper), wherein foaming of the hot adhesive layer is obtained by migration of moisture from the release liner to the pressure sensitive adhesive material, which is at a temperature high enough to cause evaporation of the water with resultant foaming.

BRIEF DESCRIPTION OF THE DRAWINGS

This invention will now be described in further detail with reference to the accompanying drawings, in which:

FIG. 1 is a schematic flow diagram of a process for producing an adhesive coated plastic profile according to a first aspect of this invention.

FIG. 2 is a fragmentary longitudinal sectional view of an extrusion die for producing a shaped plastic profile.

FIG. 3 is a cross-sectional view of a die for producing a shaped plastic profile, taken at line 3—3 of FIG. 2.

FIG. 4 is a cross-sectional view taken along line 4–4 of FIG. 2.

DESCRIPTION OF THE PREFERRED EMBODIMENTS

Figure 5:
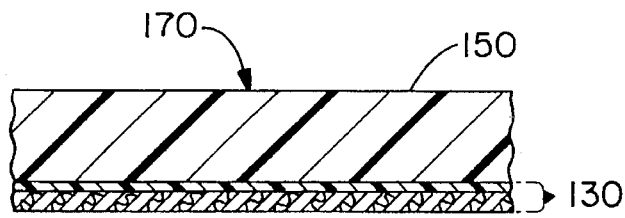
FIG. 5 is a longitudinal sectional view of an adhesive laminate comprising the adhesive coated plastic laminate of FIG. 5 plus a release paper laminated thereto.

This invention will now be described in detail with referenced to preferred embodiments thereof.

Throughout the specification, including the claims, compositions are given in percent by weight unless the contrary is expressly stated.

Coextrudates and Their Preparation Embodiment

The embodiment of this invention with reference to FIGS. 1–7 of the drawings will now be described in detail.

The adhesive laminates of this embodiment is a thermoplastic coextrudate comprising a (PE) thermoplastic carrier or backing layer which is coated on one or both sides with a pressure sensitive adhesive in the form of a thin layer. The adhesive layer in the product laminate is a non-foamed adhesive.

The pressure sensitive adhesive material for this embodiment of the invention may be any material which is known in the art as a hot melt pressure sensitive adhesive. A broader range of pressure sensitive adhesive materials may be used in this embodiment. The pressure sensitive materials include urethanes, rubbers, acrylics, silicones and polyesters.

Carrier or backing materials for this invention are thermoplastic materials which are capable of coextrusion with a pressure sensitive adhesive material as above described. Any of the thermoplastic materials which are known in the art as backing or carrier materials for pressure sensitive adhesive laminates may be used in the practice of this invention. The carrier material may be either foamed or non-foamed as desired. Carrier material may be any extrudable polymer such as, for example, polyethylene, polyethylene blends with ethylene-vinyl acetate copolymer (EVA).

The release liner may be conventional. A silicone coated release paper which is coated on one or both sides with a silicone release material is preferred. Any standard weight of silicone coated release paper, typically ranging from 40 pounds to 80 pounds may be used. The principal material or backing of the release liner may be another material, such as a film or poly coated paper, although ordinarily paper is preferred.

According to the process of this embodiment of this invention, the carrier material is first formed to desired thickness and shape. This is typically done under melt processing conditions. A conventional extruder, either single screw or twin screw, may be used. The carrier layer may be formed as a thin flat film if desired, but the carrier layer may be shaped. A channel shape will be described with particular reference to the drawings.

The carrier is coated on one or both sides with a hot melt pressure sensitive adhesive material as described above. The pressure sensitive adhesive materials may be the same or different when both sides are coated. Molten streams of pressure sensitive adhesive material are applied to one or both sides of the carrier material at the outlet of an extrusion die which is at the posterior end of an extruder. When a shaped carrier layer is used, the carrier layer is shaped before it reaches the juncture at which the adhesive stream or streams are applied. The resulting coextrudate laminate, after it leaves the extruder die is cooled, preferably in a water bath.

A continuously moving, cooled, pressure sensitive adhesive laminate web and a continuously moving we of release liner are brought together so that the pressure sensitive adhesive coating of the adhesive laminate is in contact with a release coating on the release liner. When the carrier is channel shaped, the face side of the adhesive laminate, which is ordinarily flat, will be in contact with the release liner.

This invention will be further described with reference to FIG. 1–7 of the drawings.

Referring now to FIG. 1, polyethylene pellets are fed to an extruder 100 via a charge funnel 102 at one end thereof. The solid pellets are heated in the extruder 100 to a temperature at which the polyethylene is in the molten state. The polyethylene melt is then extruded through an extrusion die 104 located at a second or posterior end of the extruder 100. Extrusion die 104 has an opening 106 of desired shape, here shown in FIG. 6 as a channel shape or U-shape. The shape shown is simply one of many since the carrier thermoplastic material can be extruded in any desired shape, including a thin flat film or ribbon of basically rectangular shape.

Figure 6:
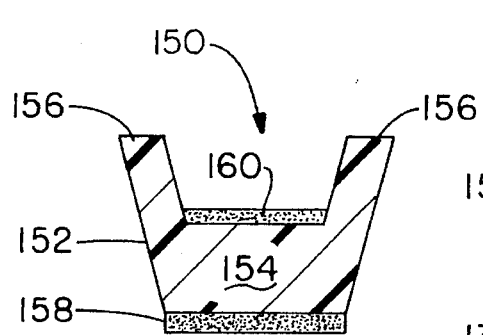
FIG. 6 is a cross-sectional view of an adhesive coated plastic laminate extrudate as it exits from a die as shown in FIG. 1.

A hot-melt adhesive is pumped through adhesive pump 110. The outlet stream from pump 110 is split into two hot melt adhesive streams 112 and 114. Two hot melt adhesive streams 112 and 114 are applied to opposite sides of the carrier or backing material to form a coextrudate, as will be described below. Where it desired to apply adhesives of different compositions to the two sides of the carrier, passageway 114 is not used and instead a second pump 116 as shown in FIG. 1, applies a second adhesive to the upper side of the carrier. The first adhesive stream 112 is passed through a passageway 118, on the lower side of extrusion die 104 near the outlet end thereof as seen in FIGS. 2 and 4. Similarly, the second adhesive stream 114 (or 116) is passed through a second passageway 120 on the upper side of extrusion die 104 near the outlet end thereof. Thus a coextrudate comprising a carrier layer and adhesive layers on either side thereof is formed at the outlet end of die 104 and is coextruded therefrom as a coextrudate laminate, as best shown in FIG. 6. It should be noted from the cross-section of FIG. 4, taken on the outlet end of the die 104 at line 4—4 of FIG. 2, that the opening 106 is enlarged to accommodate and extrude the hot-melt adhesives entering through passages 118 and 120. Since the hot-melt adhesive is at a temperature of about 350° F., and is contacting the polyethylene melt at a temperature of >350° F., there is an extremely good bond achieved between the adhesive and the polyethylene.

The coextrudate 122 leaving die 104 is cooled in water bath 124. The cooled adhesive coextrudate or laminate is then releasably laminated to the release coated side of a silicone coated release liner 130, which is preferably a release paper. A continuous strip or web of the release liner is unwound from roll 132. The resulting composite laminate is pulled forward by means of a pull unit 134 (shown diagrammatically in FIG. 4) Finally, the composite laminate is wound up on spool 140.

FIG. 6 shows the coextrudate laminate 150 as coextruded from die 104. Coextrudate laminate 150 comprises a backing or carrier layer 152, here shown as being of generally channel or U-shape, having a horizontal base portion 154 and a pair of upstanding flange portions 156; a first pressure sensitive hot-melt adhesive layer 158 formed on the lower or flat of the carrier 152, and a second pressure sensitive hot-melt adhesive layer 160 formed on the upper or channel shaped side of carrier 152. As shown in FIG. 6, the thickness of the second adhesive layer 160 is typically less than the vertical rise of flanges 156; so that the second adhesive is formed in a hollow above the base portion 154 and between the two flanges 156 of the carrier layer 152.

Figure 7:
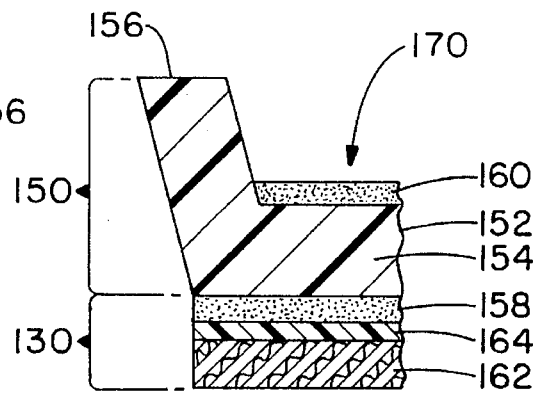
FIG. 7 is a fragmentary cross-sectional view of the laminate of FIG. 5.

FIGS. 5 and 7 illustrate a composite laminate 170 of the present invention. Composite laminate 170 comprises an adhesive laminate or plastic profile 150 releasably laminated to a release paper 130. The release liner 130 comprises a paper substrate 162 which is coated on one side with a silicone release coating 164. The release paper may be coated on both sides if desired; a release coating on the second side is not shown. As best shown in FIG. 5, the release coating 164 of the release paper 130 is applied to the first adhesive layer 158 of the coextrudate laminate or plastic profile 150.

Polyethylene has been used for illustration of a carrier material, but other thermoplastics may be used as discussed above. The typical form of the solid carrier material, as fed to the extruder 100 (FIG. 1) may vary. Polyethylene is customarily fed in pellet form as shown in FIG. 1; other carrier feed materials may be in different typical forms.

Pressure Sensitive Adhesive Foam Embodiment

The hot melt adhesive material for this embodiment of the invention is a material which is capable of being foamed or expanded by water which flashes into steam and specifically by water which migrates from a release paper during processing.

The adhesive material is a hot melt pressure sensitive adhesive. The pressure sensitive is normally tacky at room temperatures and is pumpable. Hot-melt adhesives are preferred. In addition, the adhesive in its original nonexpanded state should have a viscosity from about 10,000 to about 60,000 centipoise at 350° F. temperature.

Pressure sensitive adhesives useful in this embodiment include hot-melt adhesives and other pressure sensitive adhesives which are known in the art.

Hot-melt adhesive include A-B-A block copolymers such as those disclosed in U.S. Pat. No. 5,342,858. The A block is typically an alkenyl arene polymer derived from a monomer such as styrene. The B block is typically a polymer of a conjugated aliphatic diene monomer of 4 to 6 carbon atoms or a linear alkene monomer of 2 to 6 carbon atoms. Suitable dienes include butadiene, isoprene and the like. Suitable alkenes include ethylene, propylene, butylene and the like. When the A block is styrene-based and the B block is butadiene-based or isoprene-based, the blocks copolymers are referred to as S-B-S copolymers and S-I-S copolymers, respectively.

More broadly, the adhesive may be chosen from the following categories; urethanes, rubbers, acrylics, silicones, and polyesters. Suitable pressure sensitive adhesives from each of these categories are known in the art. Acrylics include, for example, acrylate and methacrylate copolymers such as copolymers of methyl methacrylate and ethyl acrylate. Rubbers include, for example, terpolymer elastomers made from ethylene-propylene-diene monomer (EPDM) as well as styrenebutadiene rubbers (SBR), and polymers (including copolymers) of 1,4-butadiene and isoprene.

A hot melt pressure sensitive adhesive material is ordinarily a 100 percent solids composition, i.e., it contains no materials which are liquid at ordinary temperatures. A release liner may be a conventional silicone coated paper having a moisture content from about 2 to about 8 percent by weight and coated on one or both sides with a silicone release coating. The release paper may be a conventional release paper, e.g., a 40 pound, 50 pound, 60 pound or 80 pound release paper. (40 pounds denotes a weight of 0.066 kg/m$^2$; 80 pound corresponds to a weight of 0.132 kg/m$^2$). The paper weight may vary from 20 to 100 pounds. The amount of foaming in the adhesive layer is partially governed by the total moisture content of the release paper.

A layer of pressure sensitive adhesive material in molten form is laid down on the silicone coated side of the release liner. A conventional hot melt pump is used. The thickness of the pressure sensitive layer as formed on the release liner (prior to foaming) may vary from about 1 mils (0.001 inch or 0.025 mm) to about 100 mils (0.1 inch or 2.5 mm), preferably from about 15 mils (0.015 inch) to about 30 mils (0.03 inch). Foaming requires temperatures from about 300° F. to about 350° F. The pressure sensitive adhesive is at suitable foaming temperature at the time of first contact with the release liner. Particularly when used in conjunction with the extruded adherence of the adhesive to the carrier as described above, the temperature of the hot melt adhesive is at or about 300° F to about 350° F.

The high temperature of the adhesive causes moisture to turn to gas and migrate from the release paper to the adhesive layer and to cause small bubbles in the adhesive layer, forming a foamed cellular structure. Thickness of the adhesive layer as foamed is about 1.5 to about 3.0 times the thickness prior to foaming; preferably, the thickness after foaming is about at least two times the thickness prior to foaming. Volume ratio before and after foaming may be taken as the same as the thickness ratio. Density of the foamed adhesive layer is from about 20 lbs/ft$^3$ to about 40 lbs/ft$^3$. Density ratio after and before foaming is the reciprocal of the thickness ratio.

The foamed adhesive layer thus formed is different from foamed adhesive layers obtained by conventional means such as blowing agents because the foaming is achieved by the flashing to steam of the water, and the migration of the gas into the adhesive. The foamed adhesive layer is mainly a closed cell structure.

Figure 8:
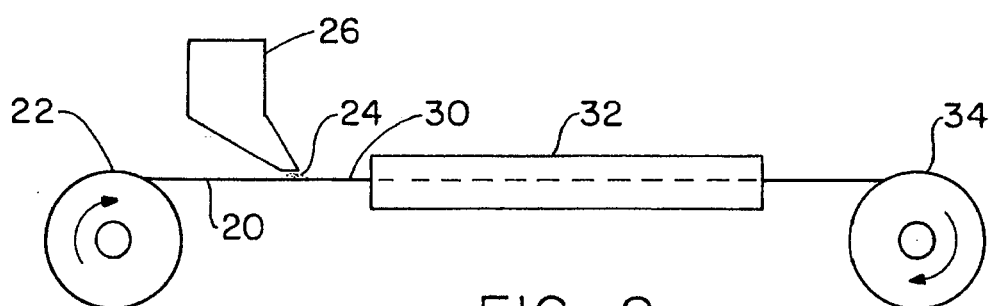
FIG. 8 is a diagrammatic illustration of a process for forming a laminate comprising a foamed pressure sensitive adhesive and a release liner according to a second aspect of this invention.

Referring now to FIG. 8, a continuous web or strip of a silicone release liner, preferably a release paper, is unwound from unwind roll 22. The web or strip may be of any desired width. The release liner may be coated on one or both sides with a silicone release coating; at least the top side (as in FIG. 1) is coated. A continuous stream 24 of molten adhesive material is pumped from melter 26 and laid down on a silicone coated surface of the release liner 20. Moisture initially present in the release paper turns to gas and migrates to the adhesive material, resulting in an adhesive foam (or expanded adhesive) layer 32 having a cellular structure. A resulting foamed adhesive laminate is wound on takeup roll 34.

Figure 9:
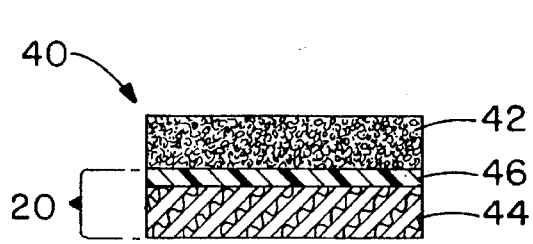
FIG. 9 is a cross-sectional view of a foamed pressure sensitive adhesive laminate produced according to the process of FIG. 8.

FIG. 9 is a diagrammatic cross-sectional view of the adhesive laminate formed in the process shown in FIG. 8. Referring now to FIG. 9, 40 is an adhesive laminate comprising a foamed or expanded adhesive layer 42 which is adhered to a release paper or other release liner 20. The release paper comprises a paper backing 44 having a silicone release coating 46 on at least one side (the side that interfaces the adhesive 42). The release liner is optionally coated the other side also; the optional coating is not shown.

The foamed or expanded adhesive layer 42 has an overall thickness of from 1 to about 100 mils, preferably about 20 to about 50 mils. The expanded or adhesive layer has a thickness (and a volume) about 1.5 to about 3 times, preferably about 2 times, the thickness (and volume) of the adhesive material prior to foaming.

Figure 10:
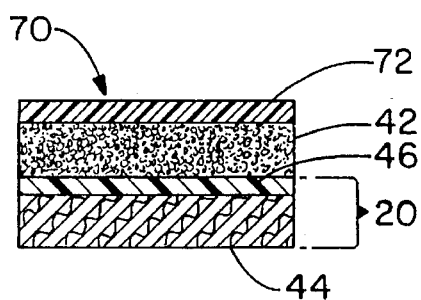
FIG. 10 is a cross-sectional view of a laminate produced according to the process of FIG. 8.

FIG. 10 is a diagrammatic cross-sectional view of an adhesive laminate produced in the process shown in FIG. 8 with an added face or liner laminated to it. In FIG. 10, 70 is an adhesive laminate comprising a foamed adhesive layer 42 laminated to a face or release coated backing layer 72 and further including a paper release liner 20 having a paper backing 44 and a silicone release coating 46, which is in contact with the foamed hot melt adhesive layer 42.

This invention has been described in detail with reference to specific embodiments thereof, including the respective best modes for carrying out each embodiment. It shall be understood that these illustrations are by way of example and not by way of limitation.

What is claimed is:

1. A process for forming a laminate comprising a foamed pressure sensitive thermoplastic material and a release liner having a backing and a release surface which comprises:

(a) applying a thin layer of a non-foamed thermoplastic hot pressure sensitive adhesive material to said release surface, wherein said backing initially contains moisture and is at a temperature below the boiling point of water; and (b) heating the resulting laminate to a temperature sufficient to cause moisture from said backing to form gas and said gas to migrate into said adhesive material to effect foaming of said adhesive material;

thereby obtaining a coating comprising a layer of a foamed pressure sensitive thermoplastic material and a release liner having a release surface to which said layer of foamed pressure sensitive adhesive material is applied.

2. A process according to claim 1 wherein said backing is a paper backing.

3. A process according to claim 1 wherein said pressure sensitive adhesive material is a hot-melt adhesive.

4. A process according to claim 1 wherein said pressure sensitive adhesive in the non-foamed state has a thickness from about 0.5 mils to about 50 mils and in the foamed state has a thickness from about 1.5 to about 3 times the thickness in the non-foamed state.

5. A process according to claim 1 wherein said pressure sensitive adhesive material in the foamed state has a density of about 40 lb/ft$^3$.

* * * * *